United States Patent [19]

Tiegel

[11] 4,146,771

[45] Mar. 27, 1979

[54] APPARATUS FOR MAKING A SIDE TERMINAL WELD

[75] Inventor: Ralph G. Tiegel, San Carlos, Calif.

[73] Assignee: Tiegel Manufacturing Company, Belmont, Calif.

[21] Appl. No.: 781,028

[22] Filed: Mar. 24, 1977

Related U.S. Application Data

[63] Continuation-in-part of Ser. No. 764,833, Feb. 2, 1977, Pat. No. 4,100,674.

[51] Int. Cl.² ............................................. B23K 11/02
[52] U.S. Cl. .................................. 219/78.16; 219/89; 219/90
[58] Field of Search ............... 219/78.01, 78.16, 86.51, 219/86.7, 88, 89, 90

[56] References Cited

U.S. PATENT DOCUMENTS

| | | | |
|---|---|---|---|
| 3,008,032 | 11/1961 | Wolfbauer | 219/89 |
| 3,136,879 | 6/1964 | Waltonen | 219/89 |
| 3,299,247 | 1/1967 | Waltonen | 219/89 |
| 3,509,308 | 4/1970 | Bende | 219/89 |
| 3,607,441 | 9/1971 | Mix | 29/623.1 |
| 3,687,734 | 8/1972 | Orlando | 136/134 |
| 3,793,086 | 2/1974 | Badger | 219/86 X |
| 4,013,864 | 3/1977 | Tiegel | 219/80 |
| 4,015,098 | 3/1977 | Matter | 219/90 |

FOREIGN PATENT DOCUMENTS

2153536 3/1973 Fed. Rep. of Germany ............. 219/89

Primary Examiner—Richard R. Kucia
Attorney, Agent, or Firm—Benasutti Associates, Ltd.

[57] ABSTRACT

An electrical resistance welding apparatus for making an integral and homogeneous connection between a terminal and a battery lug accomplished by limiting the area of contact between the two as by equipping the battery with an insulation card which is at least partially disposed between the lug and the terminal. The apparatus presses a portion of the overlapping area of the lug through an opening in the insulation card to make contact over a relatively small area with the terminal by first moving one electrode to contact the terminal and then moving the remaining electrode to contact the lug. The electrode assemblies clamp the lug and terminal together. Current is provided to the electrodes to heat up the area of contact as it is made, thereby melting the lead in the opening in the insulation card. As the lug and terminal are continuously squeezed together, more cold lead flows into the opening where the fusion is taking place. When molten lead substantially fills the opening, the current to the electrode ceases and the electrodes are withdrawn leaving an integral and homogeneous connection formed between a portion of the terminal surface and a portion of the overlapping lug surface.

18 Claims, 12 Drawing Figures

APPARATUS FOR MAKING A SIDE TERMINAL WELD

CROSS-REFERENCE TO RELATED APPLICATIONS

This application is a continuation-in-part of my prior U.S. patent application Ser. No. 764,833, U.S. Pat. No. 4,100,674, filed Feb. 2, 1977 entitled, "Method for Making a Side Terminal Weld and Product Produced by that Method", which application is incorporated by reference as if fully set forth herein.

BACKGROUND OF THE INVENTION

I. Field of the Invention

This invention pertains to an electrical resistance welding apparatus for making terminal welds in lead storage batteries.

II. Description of the Prior Art

Lead storage batteries are often made with straps connecting the individual plates in a stack together, the strap having a vertical portion called a lug. Terminals are provided in the battery for connection of the battery to external electrical cables, the terminals in some batteries being positioned in the battery side walls. A portion of the surface of the lug overlaps a portion of the inside surface of the terminal and the two must be connected together to form a good electrical connection. In one approach, the overlapping surfaces of the lug and terminal are pressed together by electrodes and an electrically welded connection is formed. One problem with this approach is that the overlapping area of contact is large creating a low electrical resistance resulting in insufficient heat at the interface thereby causing a cold weld.

Alternatively, it is known to provide the lug portion with a projection which is inserted through a hole in a battery wall and into a hole or cavity in the terminal. The complete connection between the terminal and the lug and a good seal between the terminal, battery wall and lug is obtained by exerting pressure on either side of the connection, that is, by applying pressure against the battery lug within the battery and against the terminal outside the battery so as to squeeze them together and seal the connection against the battery wall. If desired, the step of fusing the connection together can be added by applying heat to the lug and the terminal. See U.S. Pat. Nos. 3,457,118 and 3,303,056. Other methods for producing battery terminals which do not require the use of an electrical resistance welder are described in U.S. Pat. Nos. 3,849,203 and 3,874,933.

Various electrical resistance welding apparatuses and methods for making intercell connections within batteries are disclosed in U.S. Pat. Nos. 3,869,316; 3,798,071; 3,793,086; 3,723,699; 3,687,734; 3,598,948; 3,388,005; and 3,313,658. In particular, the Badger U.S. Pat. No. 3,793,086 discloses a method of making an intercell connection by placing flat surface connector lugs on each side of a battery partition wall, adjacent an aperture in the wall. Electrodes under the application of high shear force extrude the lugs into the aperture until they meet. An electrical welding current is then applied until the welded connector lugs fill the aperture with metal. The welding current then ceases and the welded connector lugs are allowed to cool and the electrodes are removed from connection in the battery casing, leaving behind a liquid-tight battery connection.

The Katz U.S. Pat. No. 2,583,575 relates to a machine for spot welding two sheets of steel through an aluminum core, the aluminum core comprising a sheet of aluminum with a hole in it. The patent discloses that the electrodes of the welding machine push in from either side on the sheets in the area enveloped in the hole and thus force the sheets of steel toward one another until they touch. Then current is applied to the electrodes and fusion occurs.

As the prior art above shows, even though electrical welding methods are known to be used for making intercell connections within a battery, the prior art does not show the use of using electrical resistance welders to construct storage battery terminals without the use of special projections, etc. on the lug or terminal or both. See the battery terminal patents enumerated above.

Today, battery terminals are cast into the walls of batteries with a portion of the casting being located on the inside surface of the battery casing adjacent to an overlapping portion of a battery lug. See U.S. Pat. No. 3,874,933. In some instances, the casting provides a boss on this inside surface. However, the area of contact between the overlapping lug surface and the terminal surface or terminal boss surface is relatively large and results in a low resistance contact thereby lowering the amount of heat generated at the interface when current is applied to the electrodes. Because a great deal of heat is required in order to melt the lead and fuse the parts together to form the terminal connection, this low electrical resistance is not desirable. Also, the requirement of projections, etc., on the terminal and/or lug which are fixed in position once they are placed in the battery can cause serious alignment problems.

SUMMARY OF THE INVENTION

In order to overcome these problems of low electrical resistance and alignment in resistance welding for battery terminals, applicant's invention discloses a preferred embodiment apparatus for connecting the terminal to the lug and affecting good fusion by limiting the area of contact between the terminal and the lug as through the use of a preferred embodiment electrical insulation means or material having an aperture therethrough. When using the insulation material, high clamping pressures are applied to extrude a portion of the lug through the hole in the insulation material to contact the terminal.

The apparatus comprises preferred embodiment internal and external electrode clamping means for both applying clamping pressures on the lug and terminal and applying high currents to the lug and terminal to fuse them together. Before the internal and external electrode clamping means can move to clamp the lug and terminal together, the battery must be moved into position adjacent to the electrodes without interference by the apparatus. To accomplish this, the internal and external electrode clamping means are moved out of the way until a battery is placed in position adjacent to the electrodes. Then, a preferred embodiment movable electrode support means initially positions the electrode clamping means about the lug and terminal before clamping.

In the preferred embodiment apparatus, a single activation means is used to move the preferred embodiment external electrode clamping means to contact the outside surface of the terminal of the battery and to move the preferred embodiment internal electrode clamping means to contact the internal surface of the lug within the battery. The activating means in cooperation with the movable electrode clamping means provides enough clamping pressure on the electrodes to extrude a portion of the lead from the lug through the aperture in the installation card to contact the inside surface of the terminal present in the battery wall. In this way, the resistance welder of applicant's invention provides a means for resistance welding a terminal to a lug within the battery resulting in good fusion.

The preferred embodiment internal and external electrode clamping means of applicant's invention comprises an internal electrode housed in an electrode holder and an external electrode housed in an external electrode holder. In the preferred embodiment, the internal electrode has a circular cross-section where the electrode contacts the surface of the lug. The area of the circular surface of the electrode corresponds roughly to the area of the aperture in the insulation means to insure a die-like action on the part of the insulation means when the lug is pressed up against the aperture. The external electrode also has a circular cross-section, the cross-section being much larger than the cross-section of the internal electrode means. The external electrode has a radius which corresponds roughly to the radius of the outside surface of the terminal to insure an even force against the terminal in the battery wall.

In the preferred embodiment, the electrode support means moves in a vertical up and down direction to allow the movement and positioning of batteries once the welding on the prior battery has taken place. Alternatively, the electrode support means would remain fixed and the battery could be moved up and down as necessary. In the preferred embodiment apparatus, the movement of the internal and external electrodes to contact the lug and terminal is substantially in a horizontal direction. However, the centerline of the internal electrode which lies generally along the path of travel of the internal electrode, is parallel but space apart from the centerline and direction of travel of the external electrode.

Once the battery is assembled, without the battery cover in place, the relative positions of the terminal and lug within the battery become relatively fixed. By placing the insulation means between the lug and terminal, the insulation means having an aperture therethrough, and then by providing the capability of vertically aligning the internal electrode so that the circular surface on the internal electrode aligns with the aperture in the insulation card, a flexible method of insuring quick welds between the lug and terminal over a variety of battery sizes is insured.

The method by which the apparatus provides a reliable terminal weld is unique. A battery is provided with the insulation card having an aperture in place on the terminal surface. The internal and external electrodes are then moved vertically into position about the lug and terminal. An activating means first horizontally moves the external electrode clamping means toward the battery terminal until the external electrode contacts the external surface of the terminal. When the external electrode contacts the terminal, the movement of the external clamping means stops since the battery is fixed in position, but the activating means continues to apply pressure in the same direction through a toggle linkage and the internal electrode clamping means moves horizontally in a direction opposite to the force being applied by the external electrode on the terminal. This serves to move the internal electrode which is connected to the internal electrode clamping means to contact the interior surface of the battery lug. Hence, a clamping action by the internal and external electrode on the lug and terminal is effected and lead from the lug is extruded through the aperture in the insulation material to contact the terminal. When contact is made, current is applied to the electrodes to create good fusion and a homogeneous connection between the terminal and lug.

Accordingly, it is an object of the present invention to provide an electrical resistance welding apparatus for connecting terminals to lugs through a battery wall.

It is a further object of this invention to provide an apparatus for providing welded terminal connections automatically and reliably.

Another object of the present invention is to provide a welding apparatus for applying a clamping action by the electrodes of the apparatus on the lug and terminal using a single activating means.

It is another object of the present invention to provide an electrical welding apparatus for both clamping the lug and terminal over a limited area of contact and applying high current to fuse the lug and terminal together.

It is a further object of the present invention to provide an electrical welding apparatus for both extruding lead from the lug or terminal through an aperture in an electrical insulation material placed therebetween and welding said lug and terminal together.

Another object of the present invention is to provide an apparatus for fusing together a terminal and a battery lug resulting in a reliable and homogeneous connection therebetween.

This and other objects of my invention will become apparent from the following description with reference to the accompanying drawings.

DETAILED DESCRIPTION OF THE DRAWINGS

Although specific forms of the invention have been selected for illustration in the drawings, and the following description is drawn in specific terms for the purpose of describing these forms of the invention, this description is not intended to limit the scope of the invention which is defined in the appended claims.

Figures 1, 6:
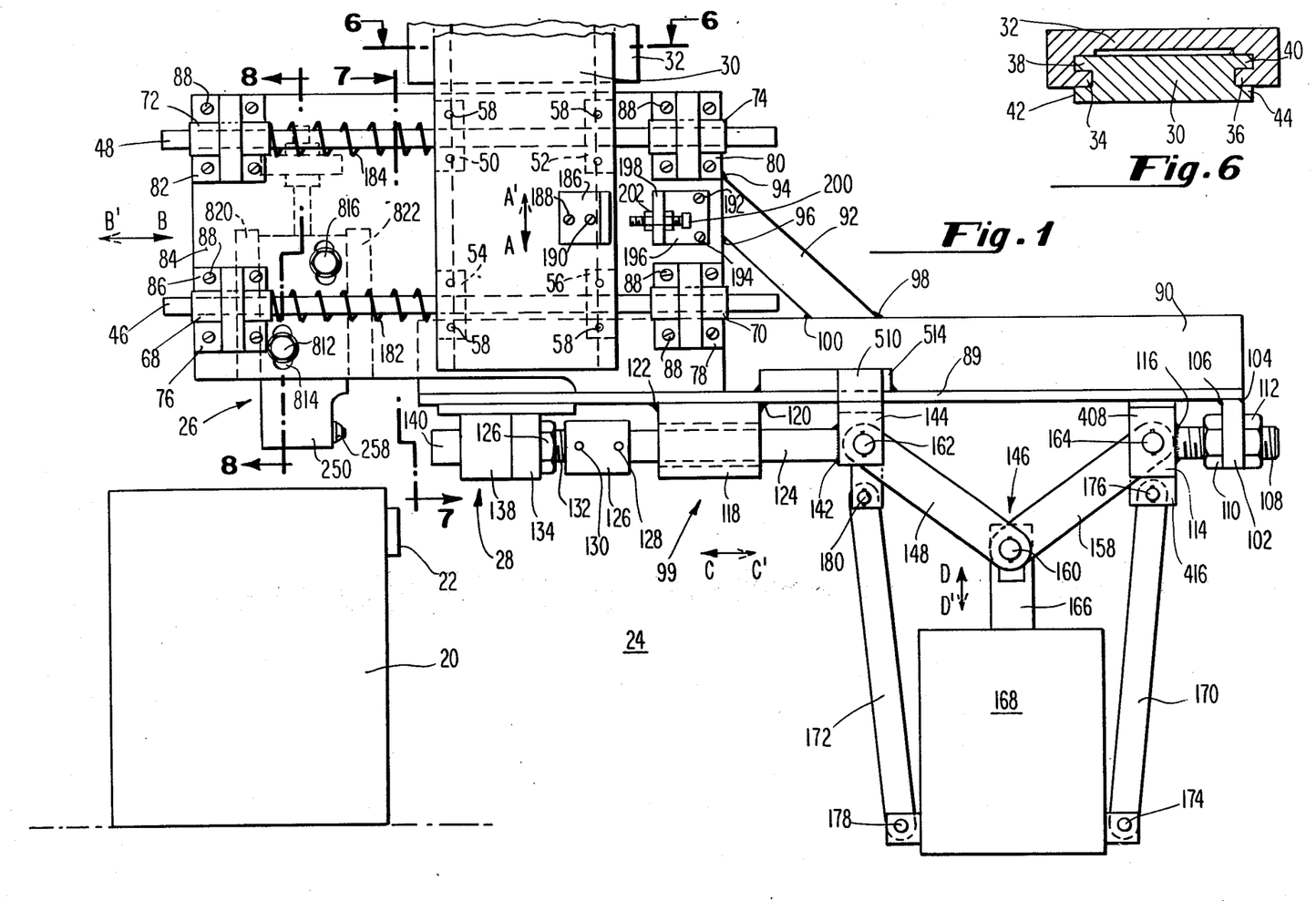
FIG. 1 is an elevation view of a portion of the preferred embodiment resistance welding apparatus of the present invention shown with the apparatus in the standby position and a battery in place adjacent the apparatus.
FIG. 6 is a cross-section of a portion of the preferred embodiment apparatus of the present invention taken as indicated by the lines and arrows 6—6 in FIG. 1.

Referring to the figures, FIG. 1 shows a battery 20 with terminal 22 shown in a position adjacent to the preferred embodiment resistance welding apparatus designated generally 24. The welding apparatus is shown in a remote position with the internal electrode means designated generally 26 and the external electrode means designated generally 28 shown positioned above the battery and horizontally spaced apart from one another. In order for the electrode means to be positioned properly about the terminal 22 of the battery 20, the entire electrode portion of the apparatus must be lowered in a vertical direction as shown by arrow A in FIG. 1. This is accomplished by moving the slide plate 30 along the slide base 32. When the welding is done on the terminal, the electrode means must be repositioned in an upward direction to allow the welded battery to move away and a new battery to be positioned in place for subsequent welding. To do this, the slide plate 30 then moves in a direction shown by the dotted arrow A' in FIG. 1 along the slide base 32. FIG. 6 shows a cross-section of the slide plate 30 in sliding engagement with the slide base 32. The slide plate 30 has slots for receiving inwardly directed flange portions 34 and 36 of the slide base. Adjacent to the inwardly depending flange portions of the slide base are portions 38 and 40 of the slide plate 30. To insure a firm movement along the slide base, the slide plate has additional portions 42 and 44 which are parallel to the outwardly depending portions 38 and 40, respectively. The firm engagement by the portions 38, 40, 42 and 44 of the plate 30 about the inwardly depending flange portions 34 and 36 of the base 32 prohibits any back-and-forth or side-to-side movement as the electrodes are lowered into place about the battery terminal. This is important in order to insure that the electrodes are properly aligned about the terminal of the battery for subsequent horizontal movements of the internal and external electrode clamping means toward one another to clamp the electrodes about the terminal and lug.

Figures 7, 9:
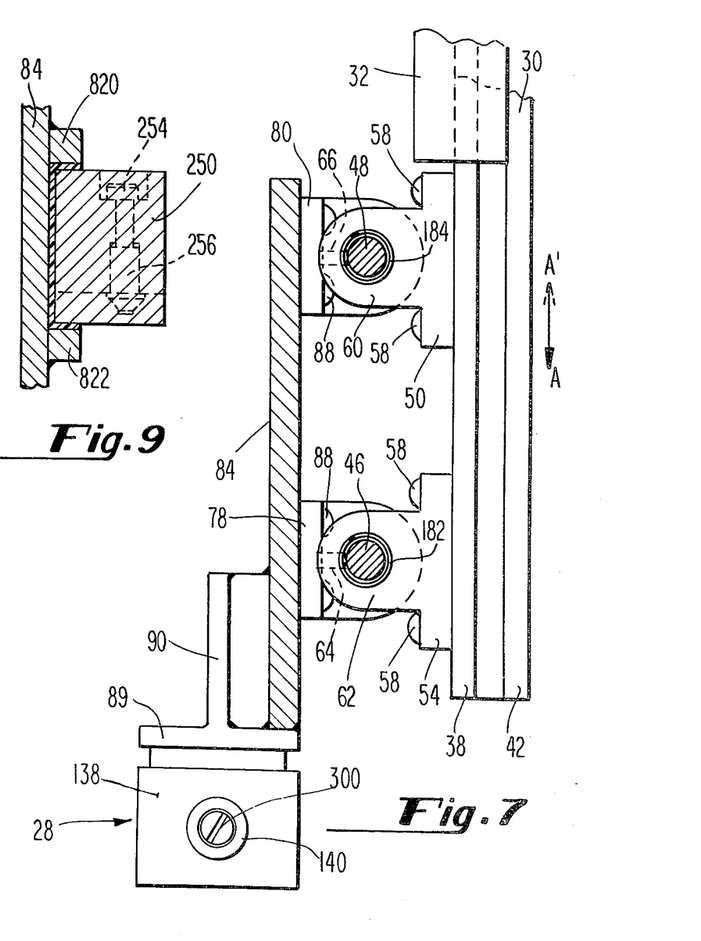
FIG. 7 is an enlarged cross-section of a portion of the preferred embodiment apparatus of the present invention taken as indicated by the lines and arrows 7—7 in FIG. 1.
FIG. 9 is a cross-section of a portion of the preferred embodiment apparatus of the present invention taken as indicated by the lines and arrows 9—9 in FIG. 8.

A side view of the moving relationship of the slide plate 30 with the slide base 32 is shown in FIG. 7. FIG. 7 is a view taken as indicated by the lines and arrows 7—7 in FIG. 1. Slide plate 30 is shown free to move along the arrows A and A' within the complementary tracks formed between the slide plate 30 and slide base 32 by the portions 38, 40, 42 and 44 and the flanges 34 and 36. FIG. 7 also shows the moving relationships of other parts of the electrode portion of the welding apparatus with respect to the slide plate 30 and slide base 32. Referring to FIGS. 1 and 7, two parallel and spaced-apart slide rails 46 and 48 are shown held in place by positioning brackets 50, 52, 54 and 56 which are held to slide plate 30 by rivets 58. In FIG. 7, brackets 50 and 54 have outwardly protruding portions 60 and 62 with respect to the slide plate 30. The outwardly projecting portions 60 and 62 have apertures through which the slide rails 46 and 48 are positioned. The slide rails 46 and 48 are held fixed with respect to the slide plate 30 within the brackets by set screws shown as dotted holes 64 and 66 in FIG. 7.

Again, referring to FIGS. 1 and 7, the slide rails 46 and 48 pass through bushings 68, 70 and 72, 74, respectively. The bushing brackets 76, 78, 80 and 82 hold the bushings in place on clamping plate 84 whereupon the clamping plate 84 is free to move back and forth in a horizontal direction as shown by the arrow B and dotted arrow B'. The bushing brackets are shown attached to the clamping plate by screws 88.

A preferred embodiment slide bar with a T-shaped cross-section 90 is shown welded to the clamping plate 84 via the connecting plate 92 at welds 94, 96, 98 and 100 and together they comprise the internal clamping means. When the clamping plate 84 slides along the slide rails 46 and 48 in directions indicated by arrows B or B', the T-shaped slide bar 90 moves along with it.

Figure 2:
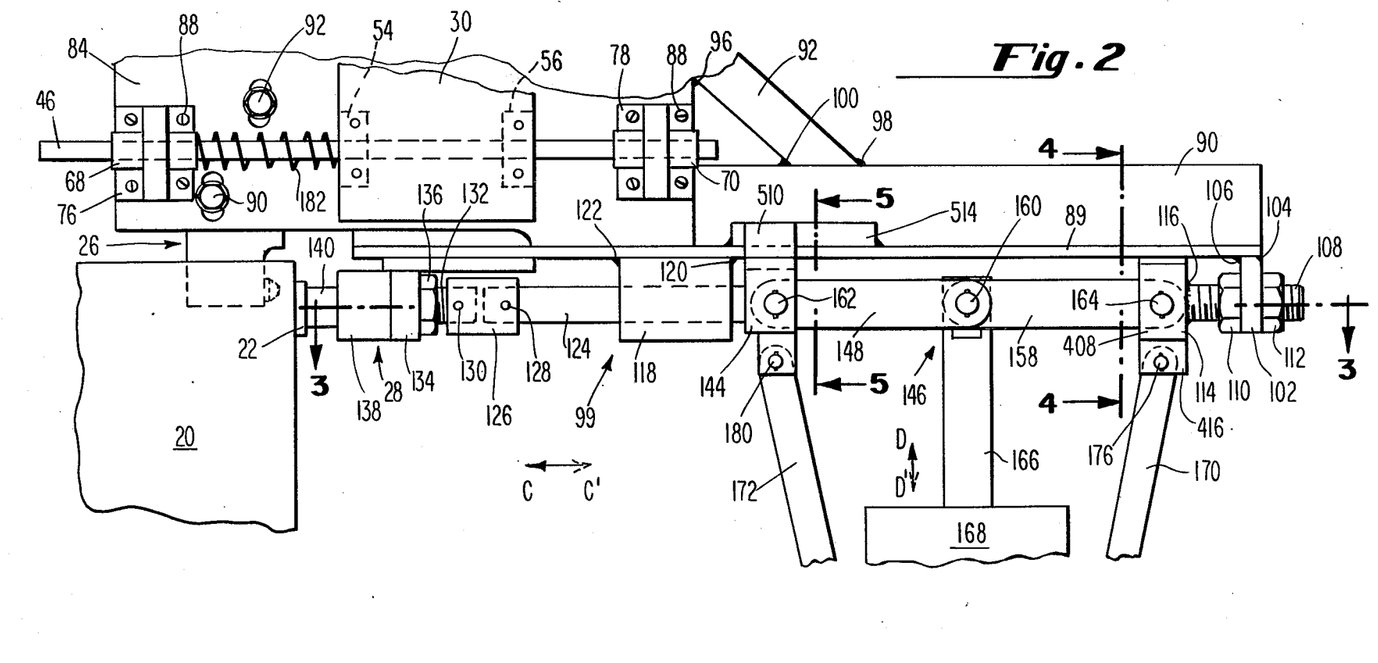
FIG. 2 is a portion of the elevation view of FIG. 1 showing the preferred embodiment apparatus with the electrodes in place about the battery terminal with a portion of the internal electrode shown in the dotted configuration.
Figure 3:
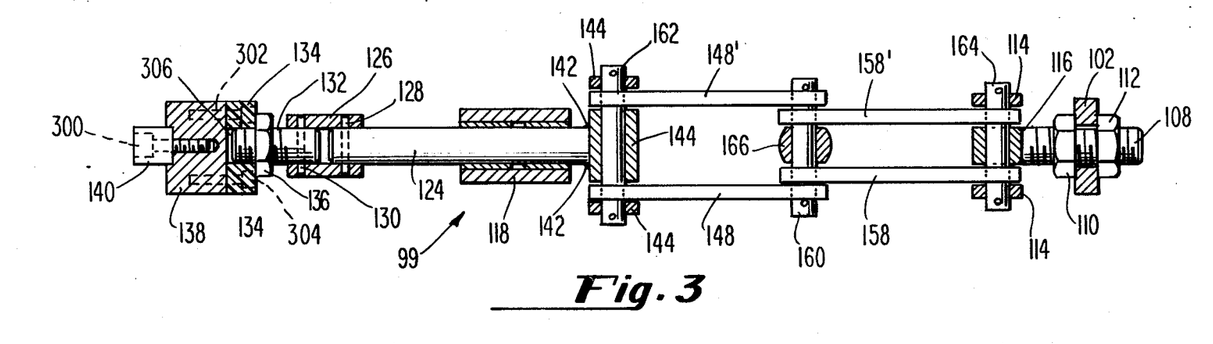
FIG. 3 is a cross-section of a portion of the preferred embodiment apparatus of the present invention taken as indicated by the lines and arrows 3—3 in FIG. 2.

Referring now to FIGS. 1, 2 and 3, the preferred embodiment external electrode clamping means designated generally 99 is attached through a toggle link to one end of the slide bar 90 by a bracket 102 welded at welds 104 and 106 to the slide bar 90. The bracket 102 extends generally down and away from the base of the slide bar 90 and has a hole therethrough. A threaded bolt 108 is inserted through the hole in bracket 102 and is fixed in relative position within the hole in bracket 102 by the nuts 110 and 112. FIG. 1 shows the threaded bolt 108 welded to a linkage retaining member 114 by weld 116. Also attached to the slide bar is a bushing mounting member 118 shown welded in FIGS. 1 and 2 to the slide bar 90 by welds 120 and 122. A drive rod 124 is free to move horizontally along the direction shown by arrow C and the dotted arrow C' in FIGS. 1 and 2, which arrows are generally parallel to the arrows B and B' in FIG. 1. The drive rod 124 is pinned at one end to a connecting member 126 by pin 128. Attached to the connecting member 126 by another pin 130 is the threaded rod portion 132, which is threaded into electrode holder interface member 134. The interface member 134 is fixed in position along the threaded rod portion 132 by nut 136. The external electrode means 28 comprises an electrode holder 138 which is bolted to the interface member 134. The electrode 140 is connected to the electrode holder 138.

The other end of drive rod 124 is welded by weld 142 to a second linkage retaining member 144. Both linkage retaining members 114 and 144 are connected to two ends of a toggle link designated generally 146.

The toggle link 146 comprises two link pairs 148, 148' and 158, 158' which are all connected by pin 160 to the piston rod 166 of cylinder activating means 168. The other end of link pair 148 and 148' is connected by pin 162 to the linkage retaining member 144 and the other end of link pair 158 and 158' is pinned by pin 164 to the linkage retaining means 114.

The preferred embodiment activating means 168 is maintained in a position with respect to the electrode portion of the welding apparatus by the links 170 and 172. Link 170 is attached at one end to the cylinder housing by pin 174 and, at the other end, link 170 is pinned by pin 176 to the linkage retaining member 114. The link 172 is similarly pinned by pin 178 to the cylinder housing and, at the other end, it is pinned by pin 180 to the linkage retaining member 144.

FIG. 3 provides a cross-sectional view of the preferred embodiment external electrode clamping means which comprises the interface member 134 with threaded aperture 306; the threaded rod portion 132 shown threaded into aperture 306 and fixed in position by nut 136; the connecting portion 126 to which the threaded rod portion 132 is pinned by pin 130; the drive rod 124, shown pinned by pin 128 to connecting portion 130 at one end and welded by welds 142 at the other end to sliding linkage retaining member 144. The drive rod 124 passes through the bushing mount member 118 and is in sliding engagement therewith. The external electrode clamping means 99 is connected at one end to the electrode holder 138 which is bolted to interface member 134 by bolts 302 and 304, and at the other to the toggle link 146 by the pin 162, shown clearly in FIG. 3 passing through the toggle linkage pair 148 and 148'. Pin 160 is shown connecting the toggle linkage pair 148 and 148' to the toggle linkage pair 158 and 158' and to the piston rod 166. The other end of the linkage pair 158 and 158' is pinned by pin 164 to the linkage retaining member 114 shown in cross section. The threaded rod portion 108 is welded by weld 116 to the linkage retaining member 114 and passes through the bracket 102 which is welded to the slide bar 90. In order to position the threaded rod portion 108 horizontally with respect to the bracket 102, the nuts 110 and 112 are utilized.

When the cylinder 168 is activated, the piston rod 166 moves in a direction shown by arrow D and the toggle linkage moves from the angular position of FIG. 1 to a position in which the link pairs 148, 148' and 158, 158' attempt to become horizontal as in FIG. 2. As this happens, the linkage retaining member 144 moves in a direction shown by arrow C in FIGS. 1 and 2 along the slide bar 90 until the electrode 140 impacts the terminal 22. The drive rod 124, which is attached to the linkage retaining member 144, moves in the direction of arrow C through the bushing mounting member 118 pushing the connecting member 126 which, in turn, pushes the electrode holder 138 by way of the threaded rod 132 and interface member 134. However, before the toggle link pairs 148, 148' and 158, 158' reach the horizontal position shown in FIG. 2, the electrode 140 impacts the terminal 22 and can proceed no further since the battery 20 is fixed in its position with respect to the welding apparatus. The cylinder 168 continues, however, to exert a force in the direction of arrow D in an attempt to straighten the toggle link pairs 148, 148' and 158, 158' into the horizontal position shown in FIG. 2 and this creates a force in the direction of arrow C'. Because of this force and the freedom of the connecting plate 84 and slide bar 90 to move in a direction shown by arrow B along the slide rails 46 and 48, the entire internal electrode clamping means of the welding apparatus then moves in an opposite direction to that of the force exerted on the electrode 140.

As the clamping plate and bar 90 move in a direction shown by arrow B, the internal electrode means 26, which is attached to the clamping plate 84, impacts the lug within the battery exerting a force on the lug in the direction shown by arrow B, which force is opposite to the force exerted by electrode 140 against the terminal 22. This then provides a clamping action by the internal electrode means 26 and the external electrode means 28 against the terminal and the internal lug within the battery.

The separation between the end of the threaded rod portion 108 and the circular face of the electrode 140 when the toggle linkage pairs 148, 148' and 158, 158' are in the horizontal position is governed by the threading of the threaded rod portion 108 within the aperture in bracket 102 locked in position by nuts 110 and 112, and also by the threaded drive rod portion 132 which is pinned in place by pin 130 in the connecting portion 126, but which can be threaded with some flexibility within the interface portion 134. This threaded rod portion 132 is fixed in position by the nut 136.

Figure 4:
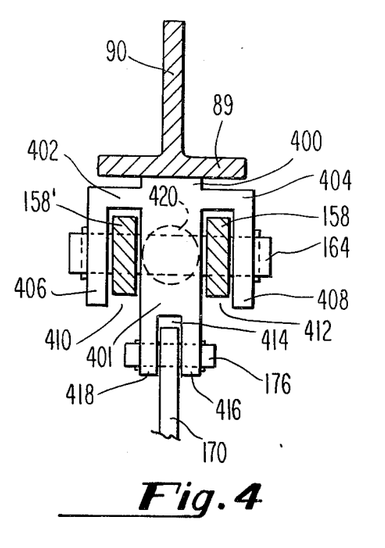
FIG. 4 is a cross-section of a portion of the preferred embodiment apparatus of the present invention taken as indicated by the lines and arrows 4—4 in FIG. 2.

FIG. 4 shows an end view of the linkage retaining member 114 and its relationship to the T-cross-section slide bar 90 as viewed by the lines and arrow 4—4 in FIG. 2. A top portion 400 of the main body portion 401 of the member 114 is shown contacting the horizontal base 89 of the slide bar 90. Arms 402 and 404 extend horizontally away from the main body portion 401. Joined to the horizontal arms 402 and 404 are vertical sections 406 and 408 which extend generally downward and away from the slide bar 90. The parallel and spaced-apart vertical sections 406 and 408 form slots or regions between themselves and the main body member 401 as a result of the horizontal portions 402 and 404 of the linkage retaining member 114. The slots are labelled 410 and 412 in FIG. 4. Pin 164 is shown passing through the vertical sections 406, the toggle linkage 158'; the main body portion 401; the toggle link 158 and the vertical section 408. The linkage pair 158' and 158 is shown in cross-section.

The main body portion 401 of the linkage retaining member 114 has a slot in the lowermost end labelled 414 formed by downwardly extending arm portions 416 and 418. The linkage arm 170 slips into the slot and is pinned together with the downwardly extending arms 416 and 418 by pin 176. The aperture 420 for receiving the threaded rod portion 108 is shown as a dotted line in the main body member 401 of the linkage retaining member 114.

The linkage retaining member 114 is soldered to the threaded rod portin 108 which, in turn, is fixed by the nuts 110 and 112 to the support bracket 108, which is welded to the slide bar 90. Therefore, the linkage retaining member 114 is not free to slide or move with respect to the slide bar 90.

Figure 5:
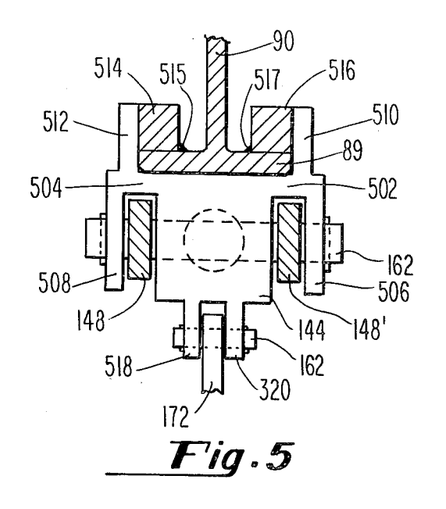
FIG. 5 is a cross-section of a portion of the preferred embodiment apparatus of the present invention taken as indicated by the lines and arrows 5—5 in FIG. 2.

FIG. 5 shows an end view of the linkage retaining member 144 as shown by the lines and arrows 5—5 in FIG. 2. Similarly, the linkage retaining member 144 has a body portion labelled 500. The top portion of the main body portion 500 engages the bottom portion of the T-cross-section slip bar 90. The top portion of the main body portion 500 extends beyond the main body portion 500 horizontally in portions 502 and 504. Connected to portions 502 and 504, respectively, are portions 506 and 508 which extend downwardly and parallel to the sides of the main body portion 500. Also extending from the horizontal portions 502 and 504 are portions 510 and 512, respectively, which extend generally upward and away from the downwardly extending portions 506 and 508. The upwardly extending portions 510 and 512 engage the sides of the base portion 89 of the slide bar 90. The sides of the base portion 89 of the slide bar 90 are extended by welding portions 514 and 516 to the base of the T-bar cross-section of the slide bar 90 at welds 515 and 517. The outside edges of the portions 514 and 516 are aligned with the outside surfaces of the base portion 89 of the slide bar 90. The engagement of the base portion 89 along the top of the main body portion 500 of the linkage retaining member 144 and the engagement of the inside surfaces of the upwardly extending portions 510 and 512 of the linkage retaining member 144 around the surfaces of the base 89 of the slide bar 90 and the side surfaces of the portions 514 and 516 of the slide bar provide a track on which the linkage retaining member 144 can move. The linkage retaining member 144 moves in a direction corresponding to arrow C in FIG. 1 when the rod 166 of the cylinder moves in the direction D. In order to align the motion of the linkage retaining member 144, the track formed by the portions 514 and 516 is provided.

In a similar way in which the linkage retaining member behaves, the linkage retaining member 144 holds the toggle linkage pair 148 and 148' shown in cross-section in FIG. 5 by use of the pin 162. Similarly, the linkage rod 172 attached to the cylinder housing is attached at its other end by pin 162 to the downwardly extending portions 518 and 520 of the linkage retaining member 144.

When the clamping plate 84 moves in the direction of arrow B in FIG. 1, the bushings 72 and 68 push against the springs 182 and 184 which are coiled around the slide rods 46 and 48. The springs are then compressed since the other end of the springs push against the mounting brackets 50 and 54. Hence, when the rod 166 of the cylinder 168 has finished its forward thrust and the welding operation is complete, the rod retracts to the position shown in FIG. 1 and the springs aid in moving the slide bar 90 and clamping plate 84 back to their original position as shown in FIG. 1. In order to ensure that the springs do not force the clamping plate and slide bar to override the original, initial position, a stop means is provided by means of the stop bracket 186 bolted by bolts 188 and 190 to the slide plate 30. Bolts 192 and 194 attach a bracket 196 to the clamping plate 84. The bracket 196 has a portion 198 extending away from the base of the bracket 196 and from the plane of the clamping plate 84. The portion 198 has a hole therethrough through which a threaded bolt is placed so that the stop position of the clamping plate on its return to the original position can be varied. The bolt 200 is held in place within the threaded hole in portion 198 by the nuts 202 and 204. The tip of the bolt 200 will impact a portion 187 of bracket 186 stopping the clamping plate 84 from overriding the original position.

Figure 10:
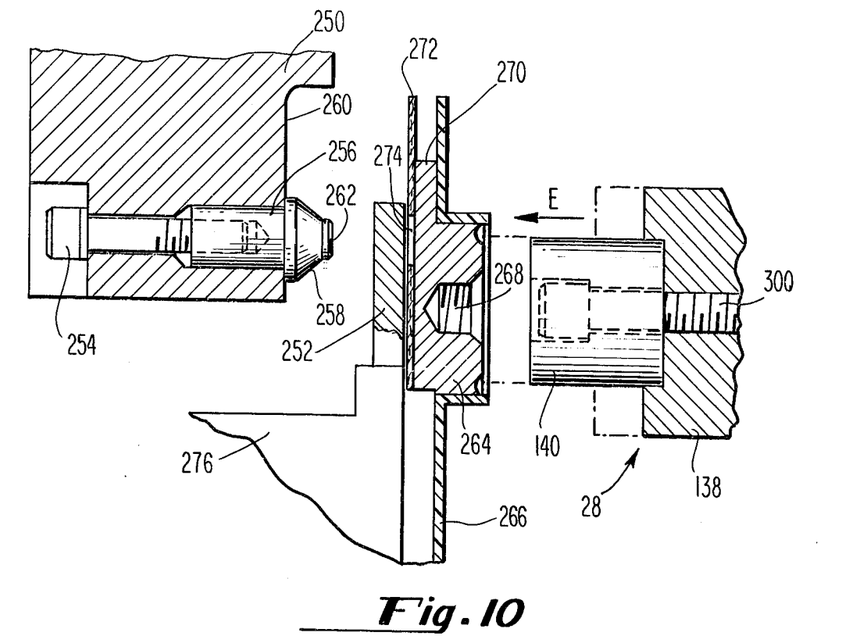
FIG. 10 is an enlarged cross-section of the preferred embodiment internal electrode means and external electrode means shown in standby position about the battery lug, insulation means, battery terminal and battery wall.

FIG. 10 shows an enlarged view of the relationship of the preferred embodiment electrode means 26 and 28 to the terminal, lug and battery wall. The external electrode holder 138 has a slot in which the electrode 140 is situated and this prevents slippage of the electrode within the holder when the electrodes clamp against the terminal. Bolt 300 fits into an insert in the electrode 140 and bolts to a threaded region in the electrode holder 138. The internal electrode holder 250 is shown partially broken away and adjacent to the lug 252 within the battery. Bolt 254 passes through an opening in the electrode holder 250 to threadingly engage the internal electrode 256. The terminal portion 258 of the electrode 256 overlaps the one edge 260 of the electrode holder 250 which reinforces the electrode 256 as it presses against the lug. The terminal portion 258 of the electrode 256 ends in a circular cross-sectional area 262. It is this portion which encounters the interior surface of the lug 252. The electrodes are shown in FIG. 10 in the standby position after having been lowered from a remote position above the battery.

The first motion of the rod 166 of the cylinder 168 of FIGS. 1 and 2 will force the external electrode means designated generally 28 comprising an electrode holder 138 and electrode 140 in FIG. 10 in the direction of arrow E in FIG. 10. The final position of the electrode holder 138 and electrode 140 are shown in phantom in FIG. 10, as the electrode 140 encounters the outside surface of the terminal 264, which is shown in FIG. 10 as being cast within the battery wall 266. The terminal 264 has a threaded aperture 268 to receive a screw-on connection of an external conductor. The terminal 264 is seen to have an interior planar surface 270 which overlaps the interior surface of the battery wall 266. Glued or attached or positioned on the interior surface of the terminal 264 is an insulation means 272 having an aperture 274. The insulation material 272 is placed intermediate the interior surface of the terminal and the surface of the lug 252 which overlaps a portion of the interior surface of the terminal. The lug 252 is shown connected to a group of elements in the battery here designated 276.

Figure 11:
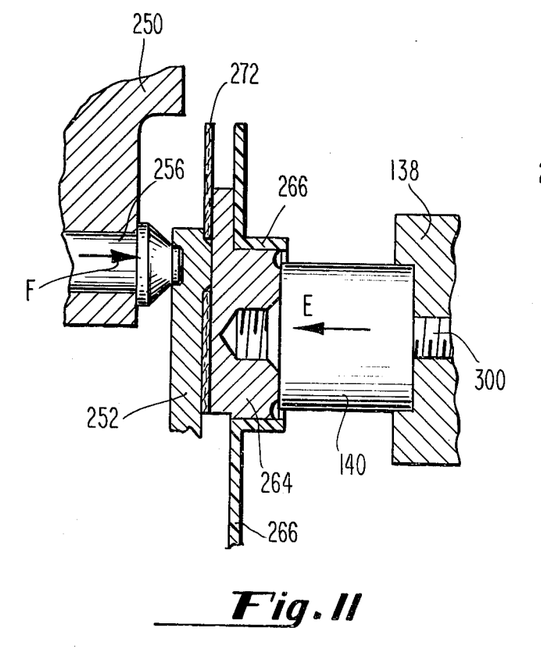
FIG. 11 is an enlarged cross-section of the preferred embodiment electrode means of FIG. 10 in the clamp and weld position showing the electrodes in contact with the lug and terminal of FIG. 10 and showing a portion of the lug extruded through the aperture in the insulation card of FIG. 10.

As was mentioned earlier, when the electrode 140 encounters the terminal 22, the movement of the rod 166 of the cylinder 168 is not complete and the toggle link pairs 148, 148' and 158, 158' are not yet in the full horizontal position as shown in FIG. 2. Since the external electrode 140 can not move any further because it has positioned itself against the terminal of the fixed battery, the internal electrode clamping means must move under the continued force of the piston rod 166 translated through the toggle linkage 146. This was described as the clamping plate 84 and slide plate 90 moving in the direction of arrow B in FIG. 1. When this happens, FIG. 11 shows that the internal electrode holder 250 and internal electrode 256 have moved in the direction of arrow F and the circular portion 262 of the electrode 256 has encountered the interior surface of the lug 252. As the lug is pressed against the insulation material 272 with a great deal of force as a result of the clamping action between the internal and external electrodes, a portion of the lug lead is extruded through the opening 274 in the insulation material 272. This is seen as having caused a portion of the lug to contact the portion of the surface of the terminal 264 in FIG. 11. The insulation material around the aperture 274 has acted as a die and the lead has been extruded through the opening.

Figure 12:
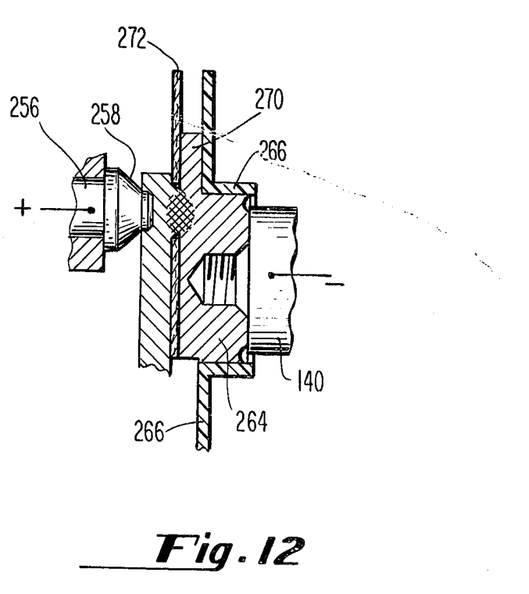
FIG. 12 is an enlarged cross-section of a portion of the preferred embodiment electrode means of the present invention shown in FIG. 11 with a voltage potential applied to the electrodes and with the fusion taking place between the lug and terminal, the fusion indicated by the cross-hatched area.

As the lead first contacts the terminal 264, a potential is applied across the electrodes as indicated by the plus and minus signs in FIG. 12. When this happens, the relatively small area of contact between the lug 252 and the terminal 264 creates a high resistance to the flow of current between the two electrodes which then causes a great deal of heat to be localized in the area of the connection between the lug and terminal. This causes melting of the lead to occur and, as the force continues to be applied in the direction of arrows E and F in FIG. 11, more cold lead from the lug and terminal are pressed together around the zone of fusion until the aperture 274 fills substantially with molten lead. Then, the voltage potential is removed from across the two electrodes and the electrodes are gradually withdrawn while the molten lead in the cavity 274 is allowed to solidify leaving behind a reliable and homogeneous connection between the lug and terminal.

The preferred method of this invention is to provide a battery with an insulation material having an aperture therethrough intermediate between an overlapping lug and a terminal cast in the battery wall. After positioning the electrodes as shown in FIG. 10, the next step is to first move the external electrode to contact the outside surface of the terminal and then, as the force is applied from the single activating means 168, the entire clamping plate 84 and slide bar 90 move in the opposite direction to that of the direction of the external electrode until the internal electrode presses against the lug, and together the internal and external electrodes clamp the lug and terminal against the insulation material. The constant pressure then forces metal from the lug to be extruded through the aperture in the insulation material. A voltage potential is then applied as the next step in the method and fusion occurs in the limited area of contact as more cold lead is forced into the opening. The potential is then removed and the external and internal electrodes are withdrawn in the opposite directions from that of the E and F in FIG. 11 to allow the molten lead to solidify forming a good connection. It will be noted in FIG. 11 that the directions of movement of the internal and external electrodes are parallel but spaced apart. It is desirable to have the connection between the lug and terminal occur at a point where there is a substantial thickness to the terminal itself. It would not be desirable to have the metal extruded through the insulation material from the lug in an area close to the centertapped hole in the terminal. This might force the internal electrode to pierce the centertapped hole thereby failing to insure a homogeneous connection. At the same time, it is desirable that the external electrode impact the terminal with a force entered at the center point of the terminal so as not to place undue stress on the battery casing wall 266 at a point surrounding the terminal casting. Hence, the forces on the lug against the terminal and the terminal against the lug as shown by the arrows E and F will create a slight torque on the battery wall overall. A lug formed in the presence of this slight torque is more likely to hold up during the lifetime use of the battery since certain similar torques will occur when the external conductors are placed on the battery in a hurried or unstudied manner by the user.

Figure 8:
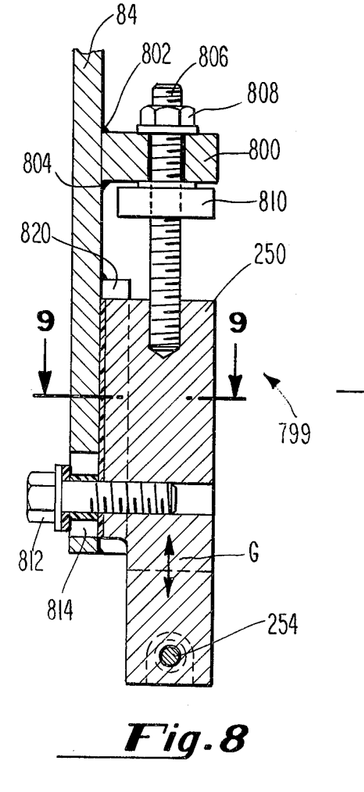
FIG. 8 is an enlarged cross-section of a portion of the preferred embodiment apparatus of the present invention taken as indicated by the lines and arrows 8—8 in FIG. 1.

It can be seen that the positioning of the internal electrode vertically up and down along the lug 252 is important. To insure that the internal electrode can be positioned properly, a vertical height adjusting means designated generally 799 in FIG. 8 is provided with the preferred embodiment of this invention. FIG. 8 shows a cross-section of the preferred embodiment vertical height adjusting means 799 for the internal electrode holder 250 and electrode 256. A horizontal bracket portion 800 is shown extending away from the clamping plate 84 and attached thereto by welds 802 and 804. There is a vertical hold through the member 800 through which a threaded bolt 806 is passed. The threaded bolt 806 is held in position with respect to the member 800 by the nuts 808 and 810. The threaded bolt 806 extends downwardly past the nut 810 and is threaded into a threaded opening in the electrode holder 250. The internal electrode holder 250 is bolted to the clamping plate 84 by two bolts, one of which 812 is shown in FIG. 8. It will be seen that the opening in the plate 84 allowing the bolt 812 to pass through into an opening in the electrode holer 250 is wider than the width of the threaded portion of the bolt itself. This is to allow for a slot for movement of the electrode holder up and down along the arrow shown by arrow G in FIG. 8. As the bolt 806 is turned one way or the other with the bolt 812 loosened, the electrode holder 250 is moved up and down along either of the arrow G in the slot 814. Two such slots and bolts hold the electrode holder 250 to the clamping plate 84 as can be seen in FIG. 1. The other bolt is labelled 816 in FIG. 1 and the slot 818. To insure vertical alignment as the electrode holder is moved up and down, parallel vertical members are attached to the clamping plate 84 and are shown by the dotted lines in FIG. 1 as 820 and 822. 820 can be seen in FIG. 8.

FIG. 9 is a cross-sectional view of a lower portion of the electrode holder and electrode as seen by the lines and arrows 9—9 in FIG. 8. Clamping plate 84 is given in cross section along with the vertical alignment bars 820 and 822. Also, a portion of the electrode holder 250 is shown along with the internal electrode 256, which is shown by the dotted line in FIG. 9. The bolt 254 which holds the internal electrode in place is also shown in dotted configuration in FIG. 9.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed is:

1. An electrical welding apparatus for welding together a terminal, disposed through a wall of a battery, and a lug, said lug being joined to a group of elements disposed within at least one cell of said battery, said lug disposed adjacent to and overlapping at least a portion of the interior surface of said terminal, said apparatus comprising:
   (a) movable external electrode means for engaging the outside surface of said terminal and for applying voltage potential thereto, said electrode means movable from a standby position to a clamping and welding position;
   (b) internal electrode means for engaging the inside surface of said lug, extruding a portion of said lug into contact with said terminal, and applying voltage potential to said lug, said electrode means movable from said standby position to a clamping and welding position;
   (c) electrode clamping means for first moving one of said electrode means to said clamping and welding position and subsequent moving said remaining electrode means to said clamping and welding position;

(d) support means for supporting said electrode clamping means and said electrode means; and (e) at least one activating means for activating said electrode clamping means to move said electrode means.

2. The invention of claim 1 wherein said electrode clamping means first moves said external electrode means to contact said terminal and subsequently move said internal electrode means to contact said lug.

3. The invention of claim 1 wherein said support means comprises: a slide base; and a sliding plate for sliding engagement with said base to move said electrode means and said clamping means from a remote position to said standby position.

4. The invention of claim 2 wherein said support means comprises a support plate and a support rod, said support rod fixedly attached to said support plate, a portion of said electrode clamping means in sliding engagement with said support rod.

5. The invention of claim 4 wherein said support means comprises a plurality of substantially, parallel and spaced-apart support rods for attachment to said support plate.

6. The invention of claim 4 wherein said electrode clamping means comprises:
(a) an internal electrode clamping means for moving said internal electrode means to contact said lug, said internal clamping means comprising:
(i) clamping plate which slidingly engages said support rod, said internal electrode means being attached to said plate; and
(ii) slide bar fixedly attached to said clamping plate;
(b) an external electrode clamping means for moving said external electrode means to contact said terminal, said external clamping means comprising:
(i) a sliding linkage retaining member for sliding engagement with said slide bar;
(ii) connecting means for connecting said sliding linkage retaining member to said external electrode means;
(iii) alignment means for aligning the movement of said external means to contact said terminal; and
(c) toggle linkage for connecting said activating means with said sliding linkage retaining member and with said slide bar.

7. The invention of claim 6 wherein said toggle link first moves said sliding linkage retaining member in a first direction toward said terminal until said external electrode means contacts said terminal, said toggle link subsequently moving said slide bar in a direction opposite to said first direction until said internal electrode means engages said lug.

8. The invention of claim 6 wherein said activating means is a double-acting cylinder and piston rod with said toggle link attached to said piston rod.

9. The invention of claim 6 wherein said alignment means is attached to said slide bar, said alignment means comprising a bushing for sliding engagement with said connecting means.

10. The invention of claim 6 wherein said electrode clamp means further comprises a spring biasing means around said support rod for biasing said clamping plate away from said sliding plate.

11. The invention of claim 6 wherein said internal electrode clamping means further comprises a position adjusting means attached to said clamping plate for precisely fixing the position of said internal electrode means with respect to said battery lug when said electrode means is in the standby position.

12. An electrical welding apparatus for fusing a terminal disposed through a wall of the battery case to a lug, said lug being joined to a group of elements disposed within at least one cell of said battery, said lug disposed adjacent to and overlapping at least a portion of the interior surface of said terminal, said battery further comprising an electrical insulation means disposed between a portion of said overlapping lug surface and a portion of said terminal surface overlapped thereby for insulating a portion of the overlapping surface of the lug from a corresponding portion of the opposing surface of the terminal, said apparatus comprising:

(a) external electrode means for engaging the outside surface of said terminal and applying voltage potential thereto, said electrode means movable from a standby position to a clamping and welding position;

(b) internal electrode means for engaging the inside surface of said lug and applying voltage potential thereto, said electrode means movable from a standby position to a clamping and welding position;

(c) electrode clamping means for first moving in a first direction said external electrode means to contact the external surface of said terminal and for subsequently moving in a direction opposite said first direction said internal electrode means to contact said lug, said electrode means pressing at least a portion of said overlapping portion of said lug not insulated from said terminal to contact said terminal;

(d) support means for supporting said electrode clamping means and said electrode means; and (e) at least one activating means for activating said electrode clamping means to move said electrode means.

13. The invention of claim 12 wherein said internal electrode means and said external electrode means each comprises an electrode holder and an electrode, said electrodes being maintained at different voltage potentials for at least a portion of the time that said electrodes are in said clamping and welding positions.

14. The invention of claim 13 wherein said movement of said external electrode from said standby position to said clamping and welding position is along an axis which is substantially parallel to and spaced apart from said movement of said internal electrode from said standby position to said clamping and welding position.

15. The invention of claim 14 wherein the plane of movement of said internal electrode is disposed above the plane of movement of said external electrode.

16. The invention of claim 15 wherein said insulation means comprise, insulation material having an aperture therethrough, said insulation material being positioned intermediate said overlapping lug surface and said terminal surface overlapped thereby, the axis of said aperture in said insulation material being substantially aligned with the direction of movement of said internal electrode means.

17. The invention of claim 16 wherein the surface area of said internal electrode which contacts said lug surface is substantially equal to the area of said aperture in said insulation material, whereby said internal electrode extrudes a portion of said lug through said aperture to contact said terminal when said internal and external electrodes are in the clamping and welding positions.

18. The invention of claim 17 wherein the surface of said external electrode which contacts said external surface of said terminal is complementally configured to match said external surface of said terminal.

* * * * *